(12) United States Patent
Todd

(10) Patent No.: US 7,797,129 B2
(45) Date of Patent: Sep. 14, 2010

(54) PROCESSING DATA TO MAINTAIN AN ESTIMATE OF A RUNNING MEDIAN

(75) Inventor: Stephen James Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/854,794

(22) Filed: Sep. 13, 2007

(65) Prior Publication Data

US 2008/0071497 A1      Mar. 20, 2008

(30) Foreign Application Priority Data

Sep. 14, 2006  (GB) ................................. 0618103.6

(51) Int. Cl.
*G06F 19/00* (2006.01)
(52) U.S. Cl. ....................................................... 702/176
(58) Field of Classification Search ................. 702/176, 702/182–185, 188, 189
See application file for complete search history.

(56) References Cited

U.S. PATENT DOCUMENTS

2005/0083419 A1 *   4/2005   Honda et al. ................. 348/244

\* cited by examiner

*Primary Examiner*—Edward Raymond
(74) *Attorney, Agent, or Firm*—Steven L. Nichols; Vancott, Bagley, Cornwall & McCarthy

(57) ABSTRACT

A method, apparatus and software are disclosed for simulating a running median value for a set of input data values, and for simulating a selected percentile value other than the median. A current estimated value is compared to an input data value. If the input data value is greater than the current estimated value, the current estimated value is increased in accordance with a first adjustment function. If the input data value is less than the current estimated value, the current estimated value is decreased in accordance with the second adjustment function. Different adjustment functions are disclosed for increasing or decreasing the current estimated value. The magnitude of each increase or decreases provided by an adjustment function is independent of the magnitude of the difference between the current input data value and the current estimated value.

20 Claims, 2 Drawing Sheets

PROCESSING DATA TO MAINTAIN AN ESTIMATE OF A RUNNING MEDIAN

BACKGROUND OF THE INVENTION

The present invention relates to a method, apparatus or software for processing a set of time spaced input data values so as to maintain an estimation of a running median.

The median of a set of data values is the middle value (or the average of two middle values) of the set of data values, determined by ordering the values. Medians are used in a wide range of applications such as reporting, controlling and monitoring systems for technical processing such as that performed in a manufacturing process, a computer processor or a communications network element such as a router. Medians are particularly useful for determining how such a system is performing and thus how that system may be tuned so as to operate as required. Medians are resistant to over-reacting to spurious or short-lived values in the set of data being analyzed and are thus often preferred over averages which can be significantly influenced by such anomalies or noise in the input data.

In order to calculate a median, the set of data values are collected and then sorted into order so as to identify the middle value or median. In the case of a running median this calculation may be performed each time a new data value is received in order to update the median. Medians are therefore more computationally expensive to calculate than, for example, averages. Furthermore, when new data values arrive frequently or in multiple streams, the computational load increases further. In some cases, for efficiency, the recalculation is limited to a predetermined number of the most recent data values, but the recalculation still involves sorting of multiple values.

BRIEF SUMMARY OF THE INVENTION

The invention may take the form of a method for processing a set of time-spaced input data values to provide an estimation of a selected running percentile of the set of input data values. A first estimated value is set to a start value. An input data value is received and compared to the first estimated value. If the input data value is greater than the first estimated value, a first adjustment function is applied to increase the first estimated value to a second estimated value. If the input data value is less than the first estimated value, a second adjustment function is applied to decrease the first estimated value to a second estimated value. The first and second adjustment functions implement predetermined adjustments that are independent of the magnitude of the difference between the input data value and the first estimated value.

The invention may also take the form of an apparatus for processing a set of time-spaced input data values to provide an estimation of a selected running percentile of said set of input data values. The apparatus includes a register for storing a current estimated value and a comparator for comparing a current input data value to the estimated value currently stored in the register. The comparator provides a first signal if the current input data value is greater than the estimated value currently stored in the register and a second signal if the current input data value is less than the estimated value currently stored in the register. A value-adjusting component responds to the first signal by increasing the estimated value stored in the register. The same value-adjusting component responds to the second signal by decreasing the estimated value stored in the register. The magnitude of each change in the stored estimated value is independent of the magnitude of the difference between the current input data value and the current estimated value.

The invention may also take the form of a computer program product for processing a set of time-spaced input data values to provide an estimation of a selected running percentile of the set of input data values. The computer program product includes a computer usable medium embodying computer usable program code. The program code is configured to set a first estimated value to a start value before receiving an input data value. The program code is also configured to compare the input data value to the first estimated value. If the input data value is greater than the first estimated value, program code increases the first estimated value to a second estimated value by applying a first adjustment function. If the input data value is less than the first estimated value, other program code is configured to decrease the first estimated value to a second estimated value by applying a second adjustment function. The first and second adjustment functions implement adjustments that are independent of the magnitude and the difference between the input data value and the first estimated value.

DETAILED DESCRIPTION OF THE INVENTION

Figure 1:
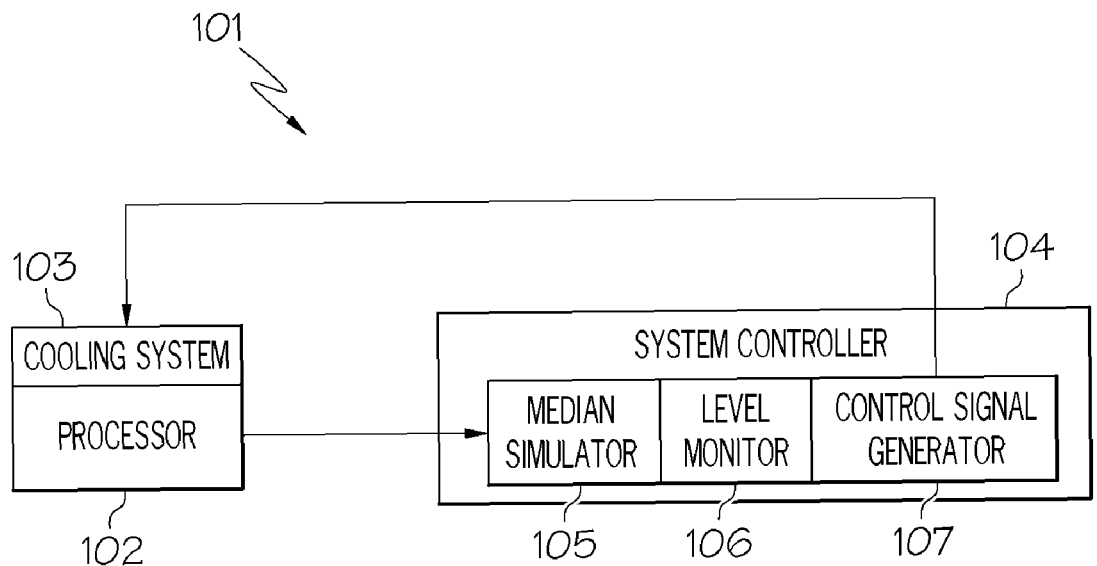
FIG. 1 is a schematic illustration of a computer processor and an associated temperature control system.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

A number of embodiments of the invention are described below, including various example implementations of a median simulator. For the purposes of illustration, some example application environments are also described. The first exemplary application environment comprises a computer processor and associated cooling system, and monitoring and control features that can be used to maintain the processor within its optimum working temperature range. A median simulator according to the invention may be implemented in many other monitoring and control systems, including more complex control systems than the first simple example described below. Another example application environment that is described below is a messaging system, and the invention is equally applicable to many other monitoring, reporting and controlling systems for technical fields including manufacturing processes and controlling operations within a computer system or network communications apparatus.

With reference to FIG. 1, a computer processor system 101 comprises a processor 102 for processing data and an associated cooling system 103 arranged to maintain the processor to within its optimum working temperature range. The processor 102 is arranged to periodically measure its operating temperature and to feed the measurements via a temperature measurement output to a system controller 104. The system controller 104 is arranged to monitor the temperature of the processor 102 and to send control signals to the cooling system 103 so that the cooling system 103 operates appropriately to maintain the optimum working temperature of the processor 102.

The system controller 104 comprises a median simulator 105, a level monitor 106 and a control signal generator 107. The median simulator 105 is arranged to receive inputs from the processor 102 in the form of a set of time separated data values each representing a measurement of the operating temperature for the processor 102 at a given time. The median simulator 105 processes the stream of data values to produce an estimation of their median value. In other words, the median simulator 105 approximates a running median from the input data values. The median simulator 105 is arranged to pass each updated estimated median to the level monitor 106. The level monitor 106 is arranged to compare each new estimated median value to a predetermined acceptable temperature range that determines the optimum operating temperature for the processor 102. If the estimated median value indicates that the operating temperature for the processor is outside the acceptable limits then an appropriate error message is passed to the control signal generator 107. The control signal generator 107 is arranged to produce a control signal for the cooling system 103 in response to an error message from the level monitor 106. The control signal is arranged to modify the operation of the cooling system 103 so as to bring the operating temperature of the processor 102 within the acceptable limits.

Figure 2:
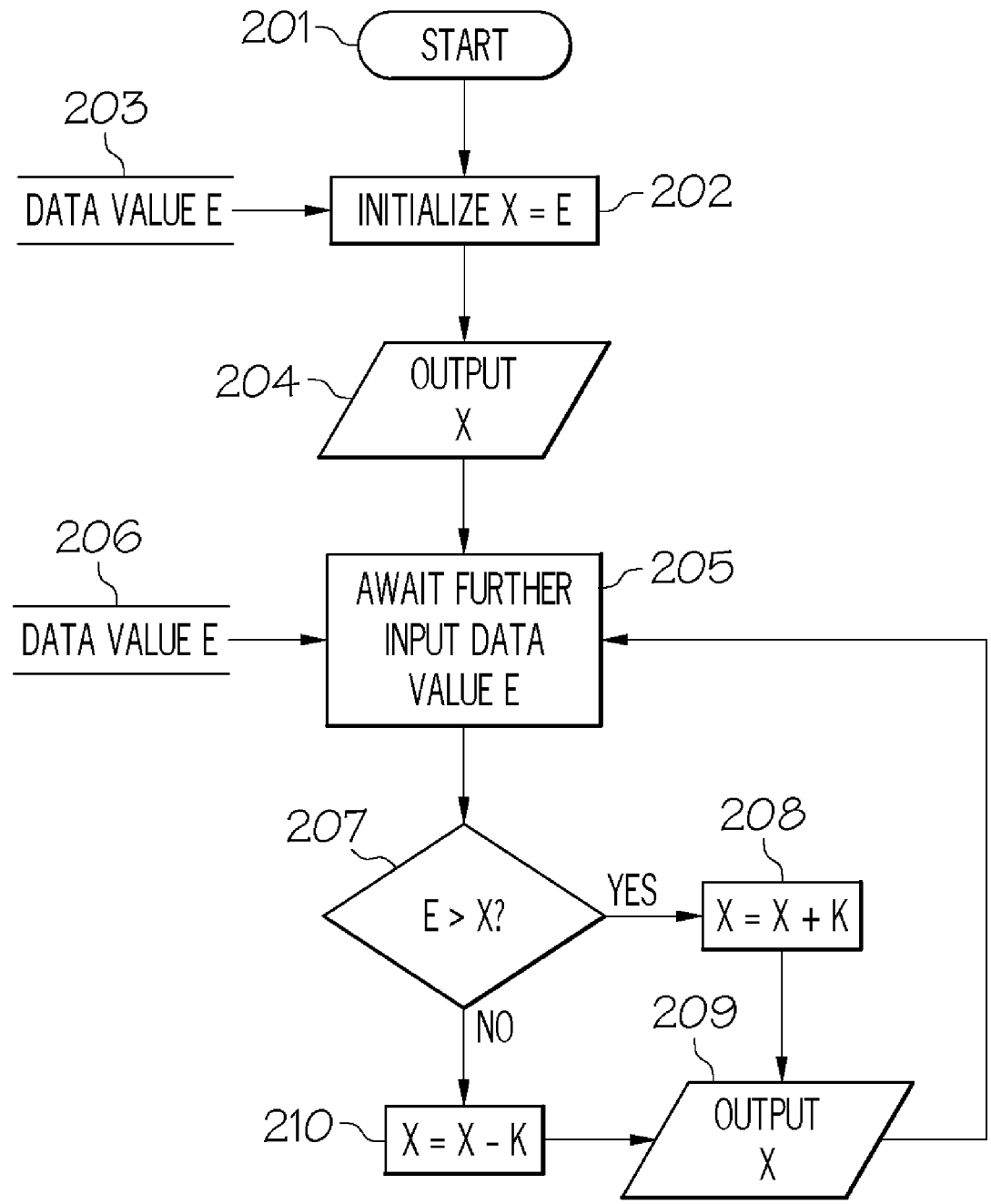
FIG. 2 is a flow chart illustrating processing carried out by the temperature control system of FIG. 1.

The processing performed by the median simulator 105 will now be described further with reference to the flow chart of FIG. 2. At step 201, the processing is initiated and processing moves to step 202 where the first input data value E is awaited from the processor 102. When the first input data value E is received at step 203, the estimated median value X is set to the data value E and, at step 204, the current estimated median X is output to the level monitor 106. Processing then moves to step 205 to await a further input data value E. When a further input data value E is received at step 206, processing moves to step 207 where the latest input data value E is compared to the current estimated median X. If the value of the latest input data value E is greater than that of the current estimated median X, then processing moves to step 208. At step 208, an adjustment function in the form of an increment of K is made to the estimated median value X. In the present embodiment, the value of K is 1. The updated estimated median value X is then output to the level monitor 106 at step 209 and processing returns to step 205 to await the next input data value E. If at step 207, the value of the latest input data value E received at step 206 is less than or equal to that of the current estimated median X then processing moves to step 210. At step 210, an adjustment function in the form of a decrement of K (where again K=1) is made to the estimated median value X. Processing then moves to step 209 and proceeds as described above. The formula applied in the processing described above can be summarized as follows:

If E>X then X=X+K, else X=X−K

The estimated median value is an approximation to the running median of the set of input data values E. The calculation of the estimated median X requires relatively fewer steps than a traditional running median calculation and provides a sufficiently close approximation to be useful in many applications.

Figure 3:
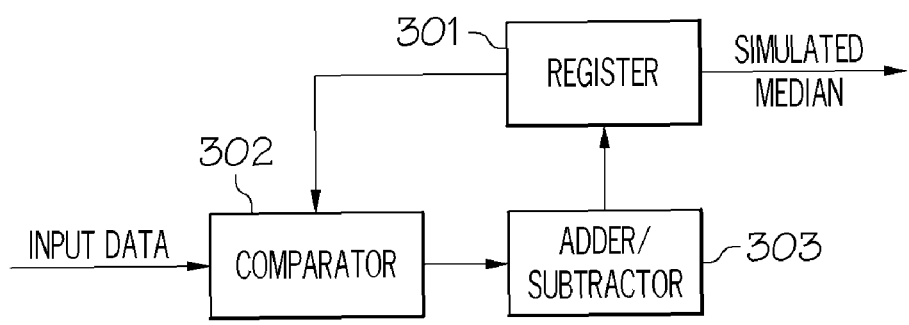
FIG. 3 is a schematic illustration of hardware arranged to carry out the processing illustrated in FIG. 2.

FIG. 3 illustrates the hardware used to implement the processing described above with reference to FIG. 2. The hardware comprises a register 301 for storing the initial and subsequent values of the estimated median, which is output at steps 204 and 209 to the level monitor 106. The register also feeds a comparator 302 with the current estimated median value. The comparator is arranged to compare the current estimated median value with each input data value from the processor 102. The result of the comparison is a signal to either increment or decrement the value in the register 301 by the amount K. This signal is fed to an adder/subtractor unit 303, which carries out the appropriate operation on the register 301. The hardware is simple and low cost but can operate at high speed to cope with a high rate of input data values.

In another embodiment, when the value of a newly input data value E is equal to the current estimated median X, no change is made to the value of estimated median X and processing awaits a further input data value E. In a further embodiment, the estimated median X is initiated to zero so as to enable the system to increment the estimated median X over a greater time period.

In another embodiment, the adjustment functions are arranged to have an adjustment value K that is variable. The adjustment value K is initially set high and then reduced either gradually or stepwise after predetermined time or number of inputs of E. This means that the estimated median X is rapidly adjusted from start up towards the estimated running median. In a further embodiment, the adjustment value K is greater or less than one (K>1 or K<1). Different values of the adjustment value K provide varying levels of damping to the fluctuations of the estimated median X.

In a further embodiment, an adjustment function is provided for positive adjustment of the estimated value to approximate a selected percentile (referred to below as estimated value PEst). Another adjustment function is provided for the negative adjustment of the estimated value PEst. These different adjustment functions or adjustment values K can be applied so as to bias the estimated value PEst to simulate a desired running percentile other than the median, say the Xth percentile for some selected number X in the range between 0 and 100. If the ratio of a first adjustment value to a second adjustment value is the same as the ratio between (a) the selected number and (b) 100 minus the selected number (i.e. the ratio between X and 100−X), the estimated value will be biased to represent that Xth percentile. The ratio of the first and second adjustment values is not dependent on the input data values. For example, a first adjustment value K1 of 4 (a positive increment of 4 when the input value is greater than the current value of PEst) and a second adjustment value K2 of 1 (decrementing by 1 when the input value is less than PEst), will result in an approximation to the running 80th percentile value.

In another embodiment, the adjustment value K is applied exponentially. In other words, the old estimated median or other estimated value X is updated in accordance with a new input data value E by being multiplied or divided by the adjustment factor. This processing can be summarized as follows:

If E>X then X=X*K, else X=X/K

This processing results in the rate of change of the estimated value X being proportional to the scale of its current value. The adjustment value K may be changed so as to provide a damping effect on the rate of change of the estimated value X. Of course, multiplication by a factor less than 1 can be numerically equivalent (and computationally cheaper) than division by a number greater than 1. Therefore, a practical implementation of 'division' according to this embodiment of the invention may comprise multiplication by a factor less than 1.

In a further embodiment, the value of the estimated median or other estimated value X is not manipulated directly, but is selected from a table T[I] of predetermined values, where I is an index value which indexes each member of the table. The index value I is incremented or decremented in response to each new input data value E. This processing can be summarized as follows:

If E>T[I] then I=I+1, else I=I−1

For example, given a table T of candidate estimated median values as follows:

T={1, 2, 3, 5, 7, 10, 20, 30, 50, 70, 100, 300}

Given a value of the estimated median X as 10, if the next input data value is less than 10, the estimated median X will be assigned the value 7. If the next input data value had been greater than 10, the estimated median X would have been assigned the value 20. In either case, it is the index I to the table T which is incremented or decremented to find the new value for the estimated median X.

In another embodiment, the candidate estimated median values are bunched about a given value so as to focus the estimated median about that given value. For example, in the following set of candidate estimated median values, the estimated median value is focussed around the value 255:

T={1, 2, 4, 8, 10, 11, 12, 20, 40, 70, 100, 130, 160, 200, 240, 250, 252, 253, 254, 255, 256, 257, 258, 260, 280, 320}

Focusing or bunching the set of candidate estimated median values in this manner provides greater stability and accuracy for the estimated median around the area of interest.

In a further embodiment, the selected candidate estimated median values are repeated several times so as to focus the estimated median more precisely on that given value. For example, in the following set of candidate estimated median values, the estimated median value is focused around the values 10 and 255:

T={1, 2, 4, 8, 9, 10, 10, 10, 10, 10, 10, 11, 11, 12, 20, 40, 70, 100, 130, 160, 200, 240, 250, 252, 253, 254, 254, 255, 255, 255, 255, 256, 267, 258, 320}

Focusing the set of candidate estimated median values by repeating one or more given values in this manner provides greater stability and accuracy for the estimated median at a specific area of interest. This is valuable where a change in value around the repeated value has a significant effect on the process being monitored. For example, in a queue depth monitoring application, where the queue implementation determines that for queues with a depth greater then 256 an index is used for certain message accesses, whereas for queues of lower depth a linear scan of the queue is used for such accesses.

An embodiment of the present invention for monitoring and controlling operations within a messaging system has a very similar architecture to that described above for monitoring a estimated running median for a time-spaced set of processor temperature values. Let us assume that the system being monitored is a messaging system, and the data values being monitored are values representing the depth of a message queue. The system processor (102-A) periodically takes readings of the queue depth, and sends these readings to the median simulator (105-A) as a sequence of data values. The median simulator computes a estimated running median from these input values, as described above, and sends its output to a level monitor (106-A). The level monitor has been programmed to monitor for a high value of the median queue depth. When a high value (higher than a predefined threshold) is identified, a control signal generator (107-A) is triggered to generate a control signal which may be fed back to the messaging system. For example, the control signal may instruct the messaging system to slow the rate at which the system will accept new messages onto the monitored queue. Alternatively, the generated signal may be fed as an alert to a system console and appropriate action can then be taken by a human operator who observes the console.

In another embodiment, multiple streams of input data values are handled by a single median simulator, which employs a lock on the current estimated median value so as to preserve its value as each input data value is processed. In a further embodiment, multiple median simulators are provided in hardware or software, each designated to one or more of a plurality of streams of input data values but all contributing to the same overall estimated median value.

Simulation of a running median according to embodiments of the present invention can be used in conjunction with other analysis and processing of data values. For example, a estimated running median may be monitored to provide an initial warning when the monitored values reach a predefined threshold or conform to a predefined pattern. In this way, the calculation and monitoring of a estimated running median may be the first of a pair of serially applied filters.

In another embodiment, two running medians may be estimated simultaneously but using different adjustment functions to achieve different damping rates. One damping rate may be applied to adapt the estimated running median automatically to long-term trends, whereas a short-term damping rate may be used to prevent very short spikes that would generate inappropriate control signals such as unnecessary alerts. This is a parallel application of two filters. The above examples of serial and parallel combinations of different filters demonstrate how the simulation of a running median according to the present invention can be used in various combinations, with or without other filters.

In another embodiment of the invention, a median or other percentile value may be calculated from an initial training set of static data, and this calculated value may then be used as the start value in the simulation of a running median or running percentile value. The static training set may also be used to determine an appropriate adjustment value (for example, finding the 80th percentile value as a starting value, and using the difference between the 78th percentile value and the 82nd percentile value to determine an appropriate scale of adjustment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for processing a set of time-spaced input data values to provide an estimation of a selected running percentile of said set of input data values, said method comprising:
   a) setting a first estimated value stored in a register of an electronic median simulator device at a start value;
   b) receiving an input data value in said electronic median simulator device;
   c) in response to the receipt of said input data value, comparing said input data value to said first estimated value with a comparator of said electronic median simulator device; and
   d) if said input data value is greater than said first estimated value then increasing said first estimated value to a second estimated value by applying a first adjustment function to said first estimated value with a value-adjusting hardware component of said electronic median simulator device, otherwise if said input data value is less than said first estimated value then decreasing said first estimated value to a second estimated value by applying a second adjustment function to said first estimated value with said value-adjusting hardware component of said electronic median simulator device, wherein the first and second adjustment functions implement predefined adjustments that are independent of the magnitude of the difference between said input data value and said first estimated value.

2. A method according to claim 1, wherein the first and second adjustment functions have the same magnitude but opposite directions of adjustment, such that the estimated value is a estimated running median value for the set of input data values.

3. A method according to claim 1, wherein said first and second adjustment functions comprise respective first and second adjustment values having magnitudes that differ from each other.

4. A method according to claim 1, wherein said first adjustment function is set to increment the first estimated value by a first value and said second adjustment function is set to decrement the first estimated value by a second value, wherein the ratio of said first value to said second value is the same as the ratio between a selected number X and the number (100 minus X), so as to bias said estimated value to approximate the Xth percentile value of the set of data values.

5. A method according to claim 1 comprising, if said input data value is equal to said first estimated value, then decreasing said first estimated median value to said second estimated value by applying said second adjustment function with said electronic median simulator device.

6. A method according to claim 5, wherein each of said first and second adjustment functions comprises a respective adjustment value that is added to said first estimated value, in the case of said first adjustment function, or is deducted from said first estimated value, in the case of said second adjustment function, to produce said second estimated value.

7. A method according to claim 1, wherein said first adjustment function comprises an adjustment value greater than 1 by which said first estimated value is multiplied, and said second adjustment function comprises an adjustment value less than 1 by which said first estimated value is multiplied, to produce said second estimated value.

8. A method according to claim 1 in which said first and second adjustment functions utilize a set of predetermined candidate estimated values, said set being indexed by an index value and said index value being incremented or decremented by said first and second adjustment functions respectively in response to an input data value, said second estimated value being selected from said set of predetermined candidate estimated values in accordance with said incremented or decremented index value.

9. A method according to claim 8 in which said set of candidate estimated values are selected so as to bias said second estimated value towards one or more subsets of candidate estimated values.

10. Apparatus for processing a set of time-spaced input data values to provide an estimation of a selected running percentile of said set of input data values, said apparatus comprising:
a register for storing a current estimated value;
a comparator for comparing a current input data value to the estimated value currently stored in the register, said comparator providing a first signal if the current input data value is greater than the estimated value currently stored in the register and a second signal if the current input data value is less than the estimated value currently stored in the register; and
a value-adjusting component responsive to the first signal for increasing the estimated value stored in the register and responsive to the second signal for decreasing the estimated value stored in the register, the magnitude of the change being independent of the magnitude of the difference between the current input data value and the current estimated value.

11. An apparatus according to claim 10, wherein the absolute value of each increase in the estimated value stored in the register is equal to the absolute value of each decrease in the estimated value stored in the register, such that the estimated value is a estimated running median value for the set of input data values.

12. An apparatus according to claim 10, wherein the absolute value of each increase in the estimated value stored in the register is different from the absolute value of each decrease in the estimated value stored in the register.

13. An apparatus according to claim 10, wherein the ratio of the absolute value of each increase in the stored estimated value to the absolute value of each decrease in the stored estimated value is the same as the ratio between a selected number X and the number (100 minus minus X), so as to bias said stored estimated value to approximate the Xth percentile value of the set of input data values.

14. A computer program product for processing a set of time-spaced input data values to provide an estimation of a selected running percentile of said set of input data values, the computer program product comprising a computer readable storage medium having computer usable program code embodied therewith, the computer usable program code comprising:
computer usable program code configured to set a first estimated value at a start value;
computer usable program code configured to receive an input data value;
computer usable program code configured to, in response to the receipt of said input data value, compare said input data value to said first estimated value; and
computer usable program code configured to, if said input data value is greater than said first estimated value, then increase said first estimated value to a second estimated value by applying a first adjustment function, otherwise, if said input data value is less than said first estimated value, then decrease said first estimated value to a second estimated value by applying a second adjustment function, wherein the first and second adjustment functions implement predefined adjustments that are independent of the magnitude of the difference between said input data value and said first estimated value.

15. A computer program product according to claim 14, wherein the first and second adjustment functions have the same magnitude but opposite directions of adjustment, such that the estimated value is an estimated running median value for the set of input data values.

16. A computer program product according to claim 14, wherein said first and second adjustment functions comprise respective first and second adjustment values having magnitudes that differ from each other.

17. A computer program product according to claim 14, wherein said first adjustment function is set to increment the first estimated value by a first value and said second adjustment function is set to decrement the first estimated value by a second value, wherein the ratio of said first value to said second value is the same as the ratio between a selected number X and the number (100 minus X), so as to bias said estimated value to approximate the Xth percentile value of the set of data values.

18. A computer program product according to claim 14 comprising, if said input data value is equal to said first estimated value, then decreasing said first estimated median value to said second estimated value by applying said second adjustment function.

19. A computer program product according to claim 18, wherein each of said first and second adjustment functions comprises a respective adjustment value that is added to said first estimated value, in the case of said first adjustment function, or is deducted from said first estimated value, in the case of said second adjustment function, to produce said second estimated value.

20. A computer program product according to claim 14, wherein said first adjustment function comprises an adjustment value greater than 1 by which said first estimated value is multiplied, and said second adjustment function comprises an adjustment value less than 1 by which said first estimated value is multiplied, to produce said second estimated value.

\* \* \* \* \*